United States Patent [19]

Fischer

[11] Patent Number: 4,813,703

[45] Date of Patent: Mar. 21, 1989

[54] FORK LIFT TRUCK

[75] Inventor: Horst Fischer, Oberhausen, Fed. Rep. of Germany

[73] Assignee: Lafis Lagertechnik Fischer GmbH + Co. KG, Oberhausen, Fed. Rep. of Germany

[21] Appl. No.: 179,533

[22] Filed: Apr. 8, 1988

[30] Foreign Application Priority Data

Mar. 10, 1988 [DE] Fed. Rep. of Germany ....... 3808007

[51] Int. Cl.$^4$ .............................................. B66F 9/06
[52] U.S. Cl. ................................. 280/43.17; 254/2 R
[58] Field of Search ............... 280/43.12, 43.17, 43.18, 280/43.19, 43.23; 254/2 R, 2 B, 93 R, 93 L

[56] References Cited

U.S. PATENT DOCUMENTS 3,260,534 7/1966 Knights ............................ 280/43.12

FOREIGN PATENT DOCUMENTS 2524163 12/1976 Fed. Rep. of Germany ... 280/43.12

Primary Examiner—John A. Pekar
Assistant Examiner—Richard Lamb
Attorney, Agent, or Firm—Herbert L. Lerner; Laurence A. Greenberg

[57] ABSTRACT

A fork lift truck includes a loading portion to be raised including a loading fork. Pivot levers are connected to the loading fork and lifting wheels are supported in the pivot levers. A lifting linkage extends inside the fork arms. A vertical battery case is mounted on the end of the loading fork. A shaft is supported in the lower portion of the vertical battery case for actuating the lifting linkage. A drive portion includes a horizontal frame plate. A drive mechanism for steering the truck, a support wheel and a pivotable hydraulic cylinder are supported on the frame plate. A lever arm has a rectangular lever plate of spring steel which is twistable about its longitudinal axis, which has a ratio of length to width of substantially 3:1 and which is disposed on edge. The lever plate has one end with a bore formed therein in which the shaft supported in the loading portion is centrally disposed and welded. The lever plate has another end with another bore formed therein. A bearing bush has one end welded into the other bore formed in the lever plate and each end thereof has a respective bearing bore formed therein. A pivot lever is welded onto the lever plate eccentric to the bearing bush. The pivot lever has one end at least partially surrounding the bearing bush and another end having a transverse bore formed therein for rotatably receiving the lower end of the hydraulic cylinder.

5 Claims, 3 Drawing Sheets

FORK LIFT TRUCK

The invention relates to a fork lift truck or pallet stacking truck including a raisable loading portion having a loading fork with lifting wheels supported in pivot levers, as well as a lifting linkage extended inside the arms of the fork. The linkage is actuatable by a shaft supported in the lower portion of a vertical battery case mounted on the end of the loading fork. The fork lift truck also has a drive portion, which has a horizontal frame plate with a steerable drive mechanism and a support wheel as well as a pivotably supported hydraulic cylinder. The hydraulic cylinder acts upon a spring steel lever arm that can be twisted about the longitudinal axis thereof. The lever arm is supported with its fulcrum in the drive portion and the other end thereof is connected to the shaft of the loading portion for raising the loading portion.

A fork lift truck of this kind which is known from German Pat. No. DE-PS 25 24 163, assures that even on uneven surfaces, the drive wheel of the driving portion always provides the necessary pressure against the surface. In other words, all four wheels are always in contact with the surface. This is because the drive portion and the loading portion and therefore the axles of the wheel of the drive portion, on one hand, and the axles of the wheels of the loading portion, on the other hand, can rotate slightly relative to one another as a result of the disposition of the twistable spring steel lever arm between the loading portion and the drive portion. However, in this prior art fork lift truck the entire lever arm is formed of spring steel. Since the lever arm has three bearing points for corresponding axles, when twistable spring steel is used there is a danger of forcing these bearings, so that although the lever can twist about its longitudinal axis, rotational movements about the bearings are only possible with difficulty.

It is accordingly an object of the invention to provide a fork lift truck, which overcomes the hereinafore-mentioned disadvantages of the heretofore-known devices of this general type, which assures an optimal and problem-free functioning capacity of the fork lift truck under all operating conditions, and in which all the functioning parts are disposed as compactly as possible with respect to one another, for the sake of attaining a minimum overall size.

With the foregoing and other objects in view there is provided, in accordance with the invention, a fork lift truck, comprising: a loading portion to be raised including a loading fork having fork arms and an end, pivot levers connected to the loading fork, lifting wheels supported in the pivot levers, a lifting linkage extending inside the fork arms, a vertical battery case mounted on the end of the loading fork and having a lower portion, and a shaft supported in the lower portion of the vertical battery case for actuating the lifting linkage; and a drive portion including a horizontal frame plate, a drive mechanism supported on the frame plate for steering the truck, a support wheel supported on the frame plate, a hydraulic cylinder pivotably supported on the frame plate and having upper and lower ends, a lever arm having a rectangular lever plate of spring steel twistable about the longitudinal axis thereof, the lever plate having a ratio of length to width of substantially 3:1 and being disposed on edge, the lever plate having one end with a bore formed therein in which the shaft supported in the loading portion is centrally disposed and welded, the lever plate having another end with another bore formed therein, a bearing bush having two ends, one of the ends of the bearing bush being welded into the other bore formed in the lever plate and each of the ends of the bearing bush having a respective bearing bore formed therein, and a pivot lever welded onto the lever plate eccentric to the bearing bush, the pivot lever having one end at least partially surrounding the bearing bush and another end having a transverse bore formed therein for rotatably receiving the lower end of the hydraulic cylinder.

As a result, only one intervening zone of the lever arm between two rigid swivel joints is made of twistable spring steel, so that forcing of the bearings is largely avoided.

In accordance with another feature of the invention, the bearing bush and the transverse bore in the pivot lever have central axes, and the welding of the pivot lever to the bearing bush is provided in such a way that a plane passing through the central axes is inclined by approximately 10 to the horizontal. This is done in order to improve the lever action and the conversion of force for lifting the loading portion.

The bearing bush itself is suitably supported pivotably in two bearing pins, which are retained in an extension protruding vertically downward from the frame plate.

In accordance with a further feature of the invention, the frame plate has extensions protruding vertically downward therefrom, and there are provided two bearing pins retained on the extensions, the bearing bush being pivotably supported on the two bearing pins.

In accordance with an added feature of the invention, the frame plate has a front edge, a rear edge, sides and a rectangular recess centrally formed therein adjoining the front edge, the frame plate has two vertically upwardly protruding ribs disposed on one of the sides of the frame plate in the vicinity of the rectangular recess, the ribs have upper ends with inwardly oriented pivot pins for rotatably receiving the upper end of the hydraulic cylinder, and the extensions are slightly laterally offset from the upwardly protruding ribs and adjoin the rear edge of the frame plate.

In accordance with a concomitant feature of the invention, the drive mechanism has a steering shaft, the frame plate has a laterally offset recess formed therein, and there is provided a bearing bush welded in the recess for guiding and retaining the steering shaft.

Other features which are considered as characteristic for the invention are set forth in the appended claims Although the invention is illustrated and described herein as embodied in a fork lift truck, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
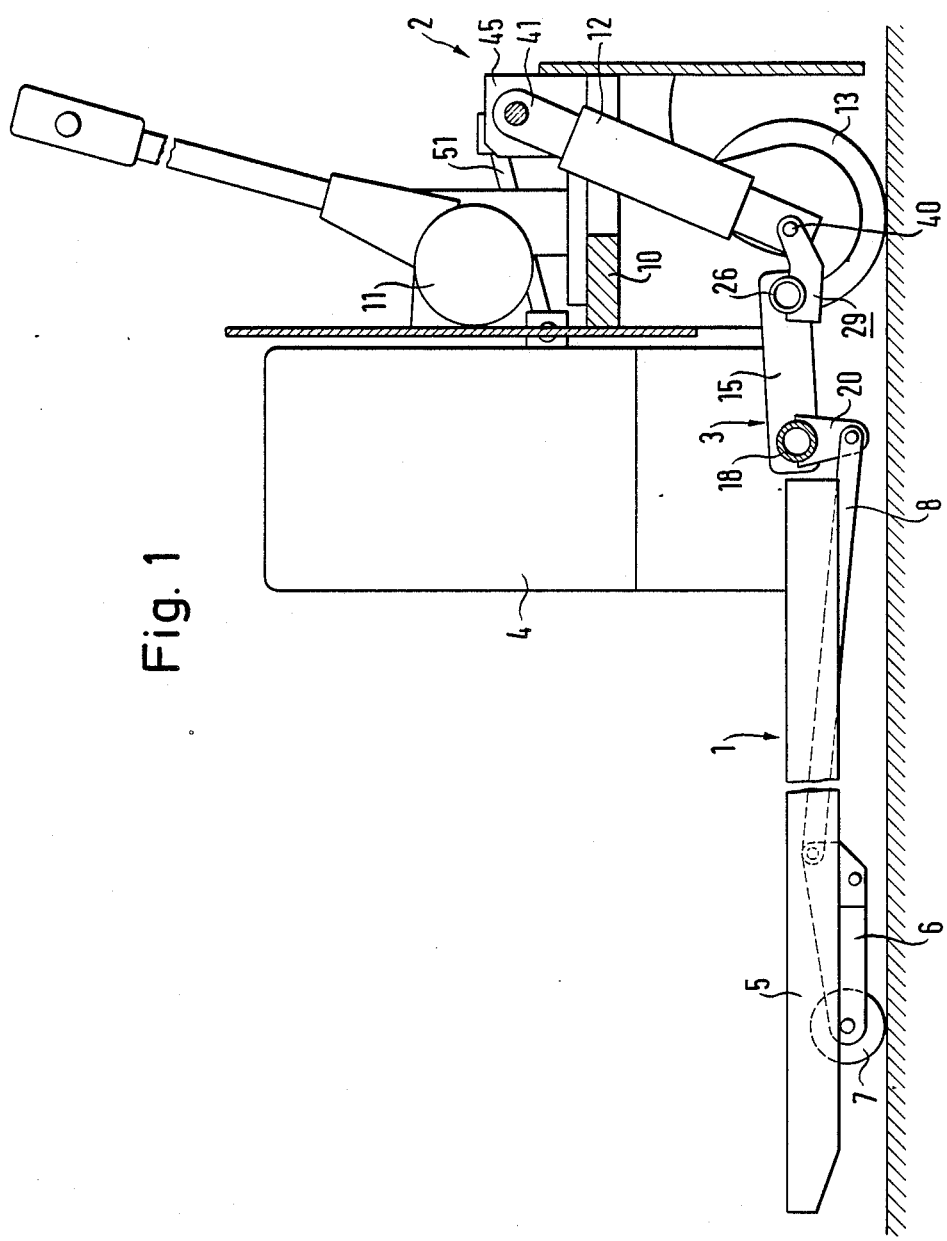
FIG. 1 is a fragmentary, diagrammatic, partially longitudinal sectional, side-elevational view of a fork lift truck in the plane of the lifting cylinder.
Figure 2:
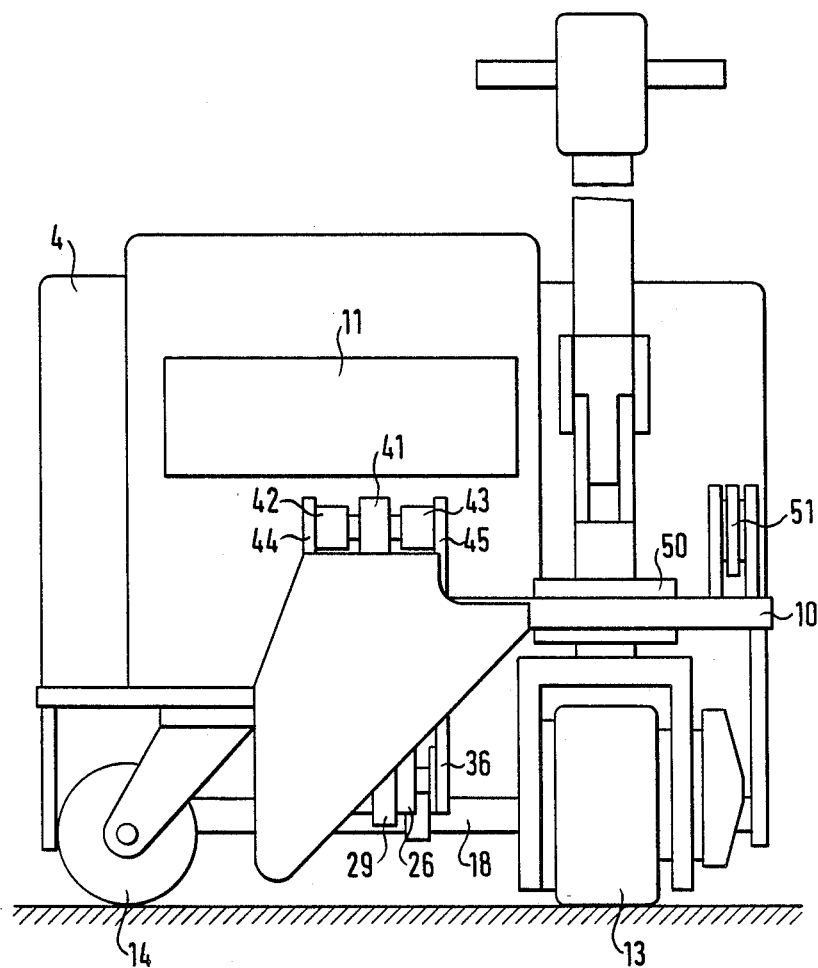
FIG. 2 is a front-elevational view of the fork lift truck.

Referring now to the figures of the drawings in detail and first, particularly, to FIGS. 1 and 2 thereof, there is seen a fork lift truck or pallet stacking truck formed of a loading portion 1 and a drive portion 2, which are connected to one another through a twistable lever arm 3 to be described in further detail below. The loading portion 1 has a vertical battery case 4 and fork tines or arms 5 secured on the lower end thereof. Both lifting wheels 7 which are supported in pivot levers 6 and thrust bars 8 extending inside the fork tines 5 for pivoting the lifting wheels 7 outward, are disposed below the fork tines.

The drive portion 2 includes a horizontally disposed frame plate 10. Non-illustrated electric regulating means and a hydraulic unit 11 for supplying a lifting cylinder 12 disposed centrally in the frame plate 10, are disposed on top of the frame plate 10. A drive wheel 13 having an integrated drive mechanism is pivotably supported on one side, and a support wheel 14 is pivotably supported on the other side in the frame plate 10, laterally of the lifting cylinder 12.

Figure 3:
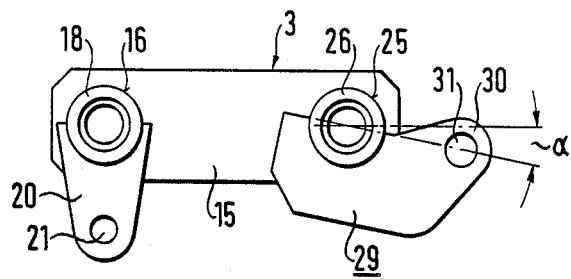
FIG. 3 is a side-elevational view of a twistable lever arm.
Figure 4:
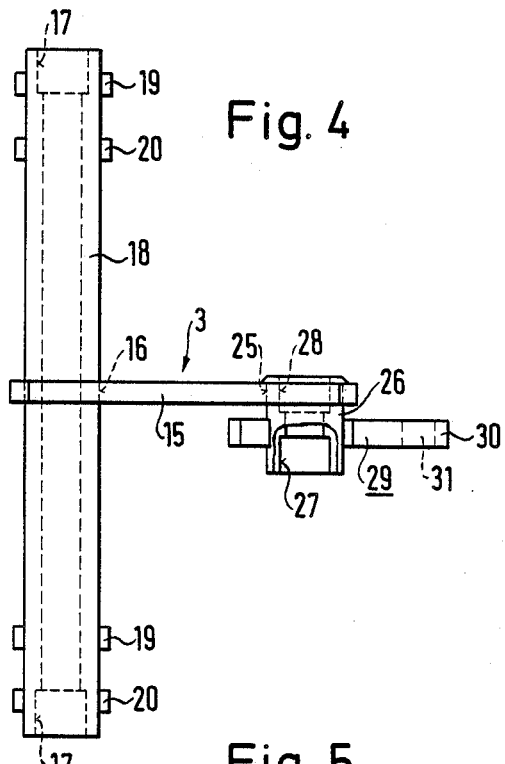
FIG. 4 is a partially broken-away plan view of the lever arm with a loading portion shaft welded thereon.

As mentioned above, the connection between the drive portion 2 and the loading portion 1 is established by means of the lever arm 3, which will be described in detail in conjunction with FIGS. 3 and 4. The lever arm 3 has a rectangular lever plate 15, which has a ratio of length to width of approximately 3:1 and is manufactured from twistable spring steel. When installed, the lever plate 15 is disposed on edge. One end of the lever plate 15 has a bore 16 for receiving a shaft 18 supported in pivot pin bores 17 in the lower portion of the battery case 4. Two vertically downwardly oriented pivot levers 19 and 20 are welded on in the vicinity of each of the ends of the shaft 18. The pivot levers 19 and 20 have lower bores 21 at which they are connected to the thrust bars 8 shown in FIG. 1, for pivoting the lifting wheels 7 outward.

The other end of the lever plate 15 has a further bore 25, into which one end of a bearing bush 26 is welded. The bearing bush 26 has bearing bores 27 and 28 on both sides. A rigid pivot lever 29 of non-twistable material is welded on somewhat eccentrically with respect to the bearing bush 26, in such a way that it surrounds the lower half of the bearing bush 26. The other end of the pivot lever 29 has an obliquely upwardly protruding extension 30 having a further transverse bore 31, in which the lower end of the lifting cylinder 12 is pivotably connected, in a manner to be explained below.

In order to provide a better lever action for raising the loading portion, the transverse bore 31 is disposed in such a way that an imaginary plane extending through the central axis of the bearing bush 26 and of the transverse bore 31, extends at an angle α relative to the horizontal, or in other words relative to the central plane of the bores of the lever plate 15. The angle α is suitably approximately 10°.

Figure 5:
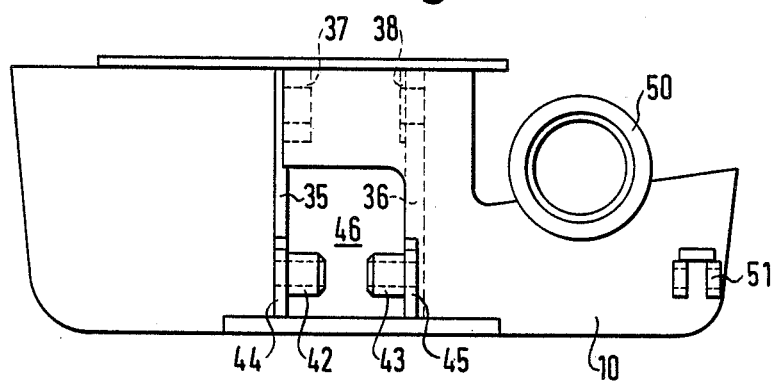
FIG. 5 is a plan view of the frame plate of a drive portion without the corresponding drive units.

The complete lever arm 3 is supported as follows. One end of the lever arm 3 is welded onto the shaft 18 for pivoting the lifting wheels 7 outward, as already described. The central bearing bush 26 is pivotably supported through non-illustrated pivot pins in bushes 37 and 38 welded onto extensions 35 and 36 extending downward from the frame plate 10, as seen in FIG. 5. The transverse bore 31 of the pivot lever 29 originating at the bearing bush 26 surrounds a pin 40 at the lower end of the hydraulic cylinder 12. The upper end 41 of the hydraulic cylinder 12 is retained in corresponding pins 42 and 43, which protrude upward from two vertically upwardly protruding ribs 44 and 45 on the frame plate 10. The lifting cylinder 12 passes through a recess 46 in the base plate 10, which leaves a certain amount of free space for the pivoting motions of the lifting cylinder 12.

The functioning of the apparatus is as follows. Whenever the loading portion 1 is to be raised, the pivot lever 29 is pressed downward by extension of the lifting cylinder 12, whereupon the lever plate 15 pivots upward about the bearing bush 26, with the bearing bush 26 serving as the fulcrum of the lever arm 3, thus raising the shaft 18 and the loading portion 1. As a result of the resultant pivot motion of the pivot levers 20, the lifting wheels 7 are pivoted downward by the thrust bars 8. The fork lift truck is driven and steered solely by the drive wheel 13 which is supported in a horizontal bush 50 in the base plate 10. When the fork lift truck is driven, all four wheels and therefore the drive wheel 13 in particular, maintain contact with the floor or surface when the truck is driven over uneven surfaces, because both the axle extending through the lifting wheels 7 and the axle extending through the drive wheel 13 and the support or pivot wheel 14 can pivot relative to one another, due to the fact that the lever plate 15 is formed of twistable spring steel. The structure of the lever arm according to the invention assures that only the axles passing through the bores 16 and 25 can twist relative to one another, but not the axles passing through the bores 31 and 25, which instead are always guided rigidly relative to one another, so that an optimal functioning without forcing the bearings is assured.

In order to provide additional guidance and security, the loading portion 1 and the drive portion 2 are joined to one another on both sides between the battery case 4 and the frame plate 10 by means of two connecting rods 51 which are disposed in one plane, are pivotably disposed and assure a reliable parallel guidance of the loading portion 1 and drive portion 2 when the loading portion is raised.

The foregoing is a description corresponding in substance to German Application No. P 38 08 007.9, dated Mar. 10, 1988, the International priority of which is being claimed for the instant application, and which is hereby made part of this application. Any material discrepancies between the foregoing specification and the aforementioned corresponding German application are to be resolved in favor of the latter.

We claim:

1. Fork lift truck, comprising:
    a loading portion to be raised including a loading fork having fork arms and an end, pivot levers connected to said loading fork, lifting wheels supported in said pivot levers, a lifting linkage extending inside said fork arms, a vertical battery case mounted on said end of said loading fork and having a lower portion, and a shaft supported in said lower portion of said vertical battery case for actuating said lifting linkage; and
    a drive portion including a horizontal frame plate, a drive mechanism supported on said frame plate for steering the truck, a support wheel supported on said frame plate, a hydraulic cylinder pivotably supported on said frame plate and having upper and lower ends, a lever arm having a rectangular lever plate of spring steel twistable about the longitudinal axis thereof, said lever plate having a ratio of length to width of substantially 3:1 and being disposed on edge, said lever plate having one end with a bore formed therein in which said shaft supported in said loading portion is centrally disposed and welded, said lever plate having another end with another bore formed therein, a bearing bush having two ends, one of said ends of said bearing bush being welded into said other bore formed in said lever plate and each of said ends of said bearing bush having a respective bearing bore formed therein, and a pivot lever welded onto said lever plate eccentric to said bearing bush, said pivot lever having one end at least partially surrounding said bearing bush and another end having a transverse bore formed therein for rotatably receiving said lower end of said hydraulic cylinder.

2. Fork lift truck according to claim 1, wherein said bearing bush and said transverse bore in said pivot lever have central axes, and a plane passing through said central axes is inclined by approximately 10° to the horizontal.

3. Fork lift truck according to claim 2, wherein said frame plate has extensions protruding vertically downward therefrom, and including two bearing pins retained on said extensions, said bearing bush being pivotably supported on said two bearing pins.

4. Fork lift truck according to claim 3, wherein said frame plate has a front edge, a rear edge, sides and a rectangular recess centrally formed therein adjoining said front edge, said frame plate has two vertically upwardly protruding ribs disposed on one of said sides of said frame plate in the vicinity of said rectangular recess, said ribs have upper ends with inwardly oriented pivot pins for rotatably receiving said upper end of said hydraulic cylinder, and said extensions are slightly laterally offset from said upwardly protruding ribs and adjoin said rear edge of said frame plate.

5. Fork lift truck according to claim 4, wherein said drive mechanism has a steering shaft, said frame plate has a laterally offset recess formed therein, and including a bearing bush welded in said recess for guiding and retaining said steering shaft.

* * * * *